(12) United States Patent
Lin et al.

(10) Patent No.: US 7,187,811 B2
(45) Date of Patent: Mar. 6, 2007

(54) METHOD FOR IMAGE RESOLUTION ENHANCEMENT

(75) Inventors: Chin-Teng Lin, Hsinchu (TW); Her-Chang Pu, Taipei (TW); Sheng-Fu Liang, Tainan (TW); Jia-Lin Chen, Hsinchu (TW)

(73) Assignee: Advanced & Wise Technology Corp., Hsinchu (TW)

( * ) Notice: Subject to any disclaimer, the term of this patent is extended or adjusted under 35 U.S.C. 154(b) by 717 days.

(21) Appl. No.: 10/389,943

(22) Filed: Mar. 18, 2003

(65) Prior Publication Data

US 2004/0184657 A1    Sep. 23, 2004

(51) Int. Cl.
G06K 9/32    (2006.01)
(52) U.S. Cl. .................................................. 382/299
(58) Field of Classification Search ................ 382/298, 382/299
See application file for complete search history.

(56) References Cited

U.S. PATENT DOCUMENTS 5,875,268 A * 2/1999 Miyake ...................... 382/276
5,991,464 A * 11/1999 Hsu et al. ................... 382/300

OTHER PUBLICATIONS

Plaziac, Nathalie. "Image Interpolation Using Neural Networks": Nov. 1999. IEEE Transactions on Image Processing. vol. 8, Issue 11. pp. 1647-1651.*
Liang, L., Ernesto Basallo, and Carl G. Looney. "Image Edge Detection with Fuzzy Classifier": 2001. Proc. ISCA 14th Int. Conf. CAINE-01.*
Bao, Paul and Benny Leung. "Wavelet Transform Image Coding based on Fuzzy Visual Perception Modeling": Mar. 1998. Proceedings of SPIE. vol. 3390. pp. 643-654.*
Bock, F., A. Steudel, H. Clausert, and M. Glesner. "A Fuzzy Rule-Based System for the Subjective Quality Evaluation of Distorted Images": Jul. 1997. IEEE International Conference on Image Processing and its Applications (IPA). pp. 448-452.*
Li, Xin, and Michael T. Orchard. "New Edge-Directed Interpolation": Oct. 2001. IEEE Transactions on Image Processing. vol. 10, No. 10. pp. 1521-1527.*
Udupa, Jayaram K., Punam K. Saha, and Roberto A. Lotufo. "Relative Fuzzy Connectedness and Object Definition: Theory, Algorithms, and Applications in Image Segmentation": Nov. 2002. IEEE Transactions on Pattern Analysis and Machine Intelligence. vol. 24, No. 11. p. 1485-1500.*

* cited by examiner

Primary Examiner—Bhavesh M. Mehta
Assistant Examiner—Damon Conover
(74) Attorney, Agent, or Firm—Rosenberg, Klein & Lee

(57) ABSTRACT

The invention provides a method for image resolution enhancement, which utilizes a fuzzy analysis system simulating the human vision system and uses the neural network as a basis for digital image interpolation. After an original image is inputted in, the image analysis module will divide and classify the original image, and then each of the image being classified will be processed by either the bilinear interpolation or the neural network interpolation. Because the fuzzy analysis system is configured according to the human vision system, and because the neural network is a model obtained from learning real natural images, the vision effect of the image enlarged through the processing method of the invention is very close to the real natural image.

12 Claims, 13 Drawing Sheets

METHOD FOR IMAGE RESOLUTION ENHANCEMENT

BACKGROUND OF THE INVENTION

1. Field of the Invention

The invention relates to a method for image resolution enhancement and, more particularly, to a method that is based on a fuzzy analysis simulating the human vision system and a technique of neural network to enhance the image resolution.

2. Description of the Related Art

As innovations of technology moves on, the products of digital images such as digital cameras, digital camcorders, projectors, and multifunction office machines have become very popular with the consumers. However, all digital image products have one common technical requirement, which is image resolution adjustment or conversion. Therefore, the enhancement of high-quality image resolution technique has always been an important issue for digital image processing.

The technique of image interpolation is to convert a low-resolution image into a high-resolution image by interpolation. However, most of the image interpolation techniques, such as bilinear interpolation and bi-cubic interpolation, cannot meet the requirements of high-resolution image because the conventional image interpolation techniques always generate two obvious shortcomings, image edge jaggedness and image blurring. Similarly, other conventional interpolation techniques based on the principle of linear interpolation have the same shortcomings as the above two techniques have.

The human vision system is more sensitive to the edge of an image than to the other portion of the image such as a smooth portion or a structure portion. Therefore, when an image interpolation is applied, the image edge will be taken into consideration in particular. In recent years, the concept of image contour has been adopted to cope with the problems brought by image resolution enhancement. For example, an American Published U.S. Pat. No. 5,991,464 filed by Pohsiang Hsu etc. in 1999 entitled "Method and System for Adaptive Video Image Resolution Enhancement" was a representative example adopting the concept. Subsequently, a digital image interpolation technique based on the image contour and image edge became a developing trend. As a result, to emphasize the image edge for facilitating human eyes' observation has become an important issue as well. For example, another American Published U.S. Pat. No. 6,175,659 filed by Chien-Hsiu Huang in 2001 entitled "Method and Apparatus for Image Scaling Using Adaptive Edge Enhancement" is an image interpolation technique focusing on image edge enhancement. On the other hand, the American Published Patent Application No. 20020126900 filed by Kim and Sang Yeon in 2002 entitled "Image Interpolation Method and Apparatus Thereof" is a processing method combining the conventional interpolation technique and the image edge orientation technique.

Nevertheless, how to design a better interpolation technique and evaluate an interpolation processing method in terms of its advantages and disadvantages has always -been a challenge to the developers of pertinent techniques. To meet the challenge, the invention provides a design utilizing self-learning ability of a neural network as a compensation for the shortcomings of interpolation techniques. In addition, the invention also designs a fuzzy system for image analysis applying the concept of human vision system. The fuzzy system combines both bilinear interpolation and neural network interpolation to work as an apparatus for image classification. The purpose of the combination is to obtain a balance between the image quality and the processing time, as well as to obtain a better image quality than the quality generated by the conventional enlarging technique.

SUMMARY OF THE INVENTION

The main and first object of the invention is to provide a method utilizing a fuzzy analysis and a neural network for image resolution enhancement, which takes an inputted digital image and a desired image magnification to be enlarged from the user and then generates an image that its effect is very close to the natural image.

The second object of the invention is to provide a method for image resolution enhancement, which utilizes a fuzzy analysis system simulating the human vision system to do the analysis, and to simulate the form of a natural image by using a neural network so as to enhance the digital image resolution.

The third object of the invention is to provide a fuzzy analysis system simulating the human vision system to do the image analysis, and through the fuzzy analysis system, the mechanism for processing a digital image can be selected from either the bilinear interpolation or the neural network interpolation so that a balance can be obtained between the image quality and the processing time.

The fourth object of the invention is to provide a particular configuration of a neural network dedicated to the analysis of characteristics of natural image, and by focusing on the configuration of the neural network, an algorithm for training the weighted value of the network is designed, which makes the processed digital image look as real as a natural image.

The fifth object of the invention is to provide a method for image resolution enhancement, which enables the processed digital image to have a better image quality, and the sharpness of the image edge and the smoothness of the image can all be better.

To achieve the above five objects, according to the invention, the first step is to obtain an original image. The second step is to use the fuzzy analysis system to analyze the original image. The third step is to classify the original image into one with edge quality and the other without edge quality. The fourth step is to calculate the edge angle of the area with edge quality and to process the image with neural network interpolation, whereas the area without edge quality is processed with bilinear interpolation. Finally, after completing the whole original image processing, a high-resolution digital image is obtained.

The objects and technical contents of the invention will be better understood through the description of the following embodiment with reference to the drawings.

DESCRIPTION OF THE PREFERRED EMBODIMENTS

The invention provides a method for natural image resolution enhancement and image enlargement, which utilizes a fuzzy analysis system simulating the human vision system to analyze the image, and the fuzzy analysis system is based on the orientation of an object's edge and a neural network for digital image interpolation.

Figure 1:
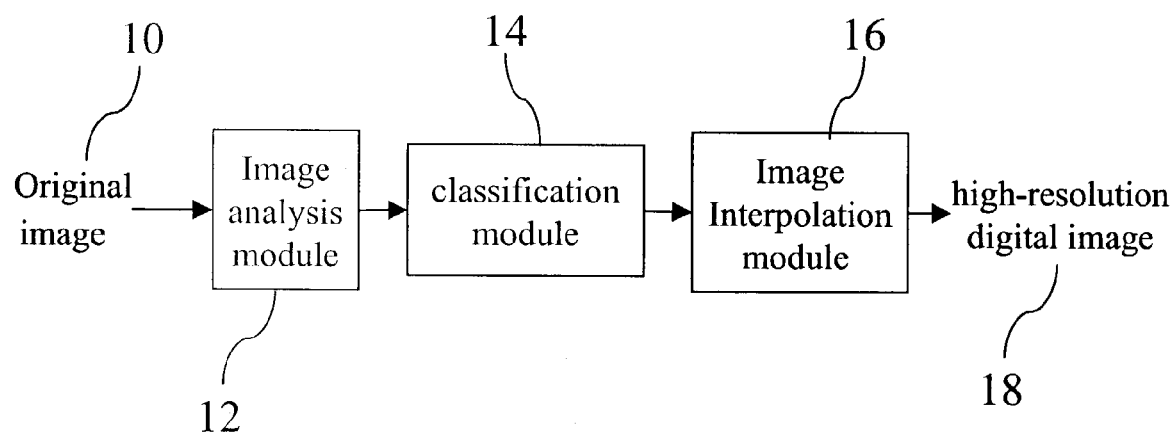
FIG. 1 is a block schematic diagram showing an apparatus used by the invention.

As shown in FIG. 1, after a low-resolution original image 10 is inputted in, an image analysis module 12 divides and analyzes the image. According to the result of analysis from the image analysis module 12, a classification module 14 then classifies the original image 10 into a smooth (or structure) area and an edge area. After that, the image is processed by the image interpolation module 16, in which the bilinear interpolation is applied to process the smooth (or structure) area of the original image, and the neural network interpolation is applied to process the edge area of the original image in order to output a high-resolution digital image 18.

Figure 2:
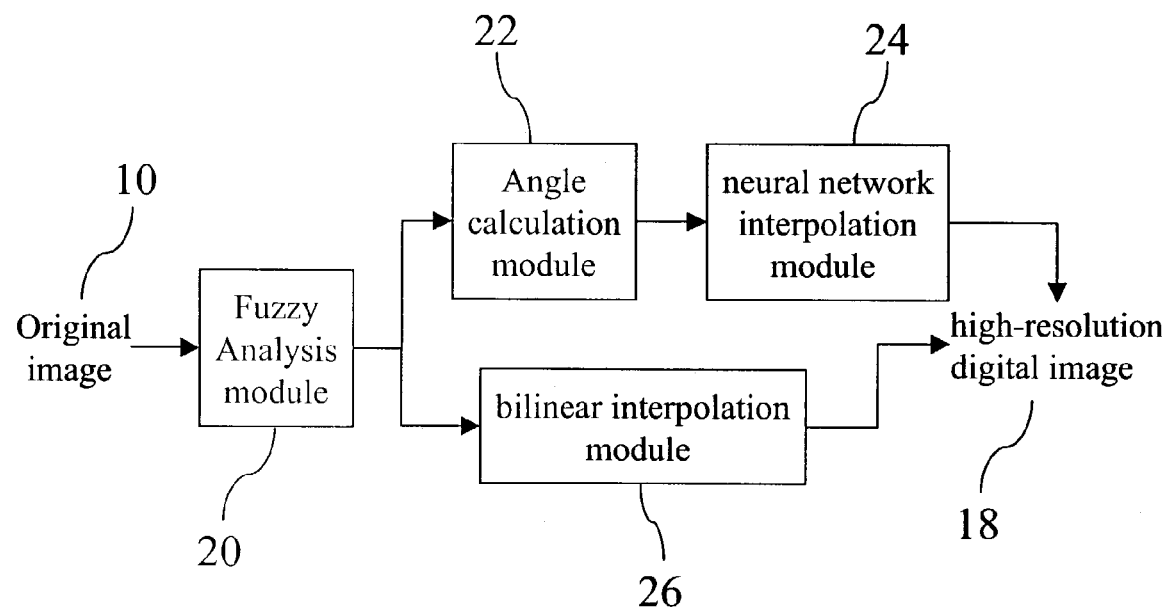
FIG. 2 is a schematic diagram showing the configuration of a fuzzy analysis system applied by the invention.

FIG. 2 is a schematic diagram showing the configuration of a fuzzy analysis system applied by the invention. As shown in FIG. 2, when the original image 10 is inputted into a fuzzy analysis system 20, the fuzzy analysis system 20 begins to analyze the original image 10 and classify it into an image with edge quality and an image without edge quality so that each of the classified image can be decided to apply either the bilinear interpolation or the neural network interpolation. The area classified to be with edge quality should be calculated its edge angle by applying an angle calculation module 22, and the original image 10 should be processed with a neural network interpolation module 24. On the other hand, if the area is without edge quality, the original image 10 should be processed with a bilinear interpolation module 26. After the whole original image has been processed, a high-resolution digital image 18 will be obtained. In addition, the neural network interpolation module 24 trains the neural network with a supervised learning method, and the pertinent parameters generated after the neural network training has been completed will be stored in a database 28.

Figure 3:
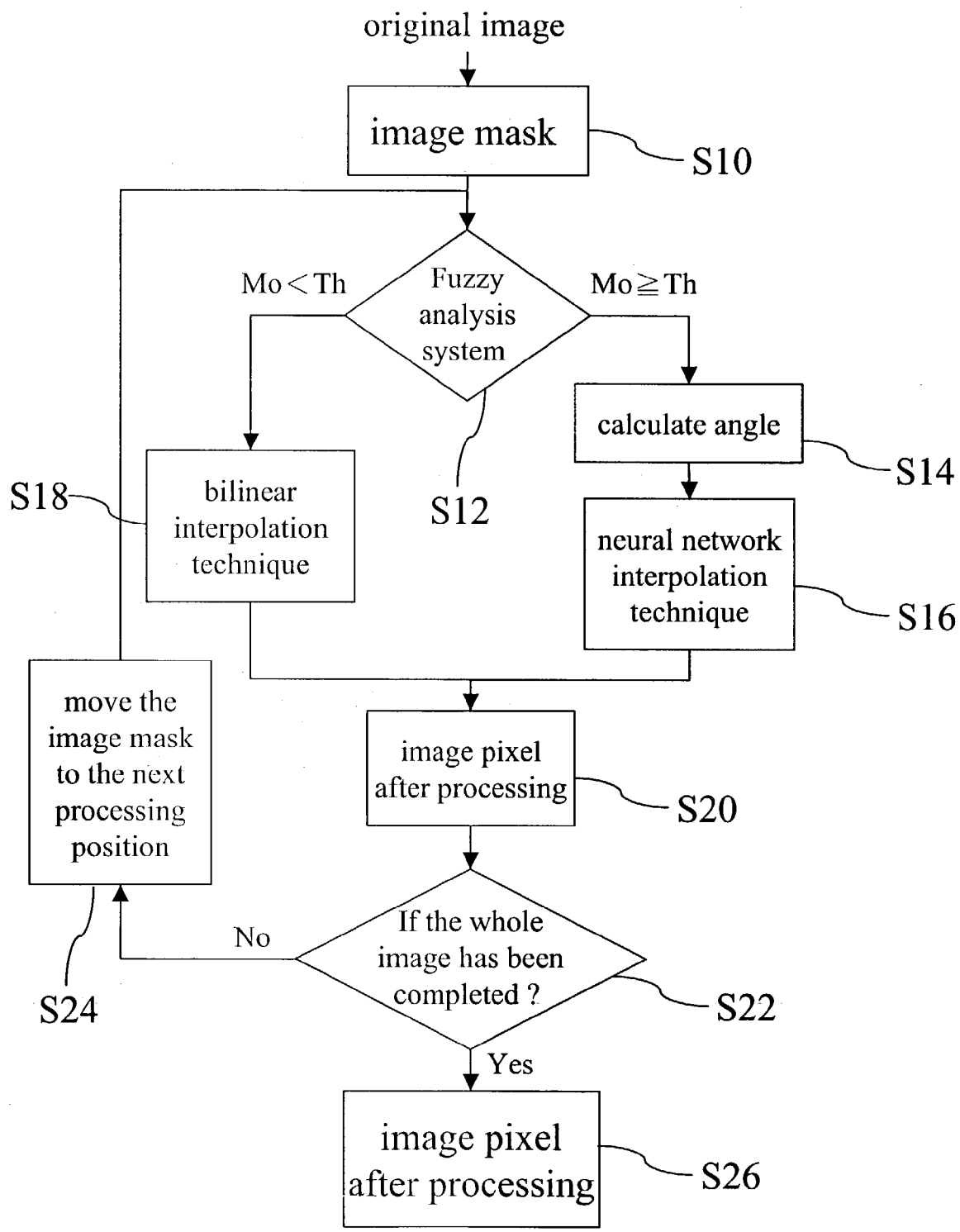
FIG. 3 is a schematic flow chart showing an image processing executed by the invention.

Referring to FIG. 3, the procedures of image processing is first to obtain an original image, and next, as shown in S10, to divide the original image by adopting an image mask of N*N pixels in order to proceed with next analysis procedure. Then, as shown in S12, a fuzzy analysis system is applied to analyze the original image and classify it into an image with edge quality and an image without edge quality. If the output variable (Mo) of the fuzzy analysis system is equal to or larger than a preset threshold value (Th), then the pixels in the area is with edge quality, which means that the neural network interpolation should be applied, and the procedure will move onto next step S14 to calculate the edge angle first. After calculation, the original image will be processed with neural network interpolation, as shown in S16. However, if the output variable Mo is less than the threshold value Th, the pixels in the area is without edge quality, which means that the original image should be processed with bilinear interpolation, as shown in S18.

After the processing, an image pixel is obtained, and then the procedure will go to S22 to check if the whole original image processing has been completed. If the answer is no, then the image mask will be moved to the next processing position as shown in S24, and the steps from S12 to S20 will be repeated. If the answer is yes, then a high-resolution digital image is completed, as shown in S26, and all the procedures of processing the image are finished.

In addition, a conventional image edge retrieving module can be applied to retrieve the edge portion of the original image first, and then an angle calculation module is applied to calculate the angle of each pixel on the image edge. After that, the derived angle and information about the edge position will be analyzed so that the original image can be categorized into the one applying the bilinear interpolation and the other one applying the neural network interpolation.

Figure 4:
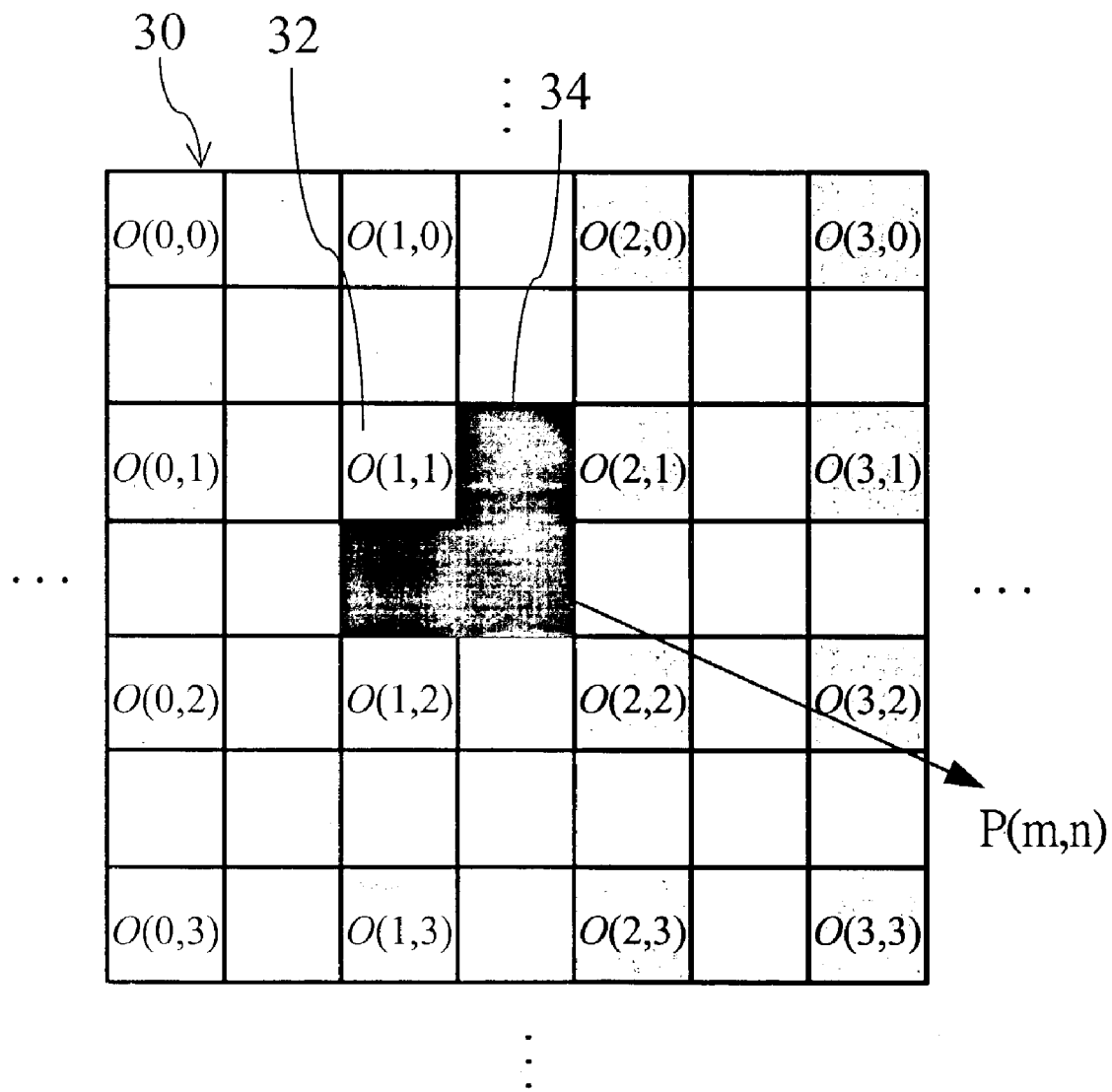
FIG. 4 is a schematic diagram showing an image mask used by the invention.

When the original image enters into the fuzzy analysis system, the image will be divided by an image mask 30 composed of N*N pixels, as shown in FIG. 4. The image mask 30 will finish scanning the whole original image by taking one pixel as a moving unit. The gray portions 32 of FIG. 4 are contents of the original image, whereas the black portions 34 are estimated positions required to be compensated by pixels when the image is enlarged. At this point, the values of pixels are undecided. The O(i,j) in FIG. 4 represents an original image, the O(1,1) represents a reference pixel, and $O(i,j)|_{i \neq 1, j \neq 1}$ represents neighboring pixels of the reference pixel, while P(m,n) on the pixel position 34 will be compensated with necessary pixel value. The image mask 30 will move itself on the original image; therefore, each pixel value waiting to be compensated will be decided, which means that the value of pixel P(m,n) to be interpolated will be determined by applying Formula (1), wherein $W_{\theta,m,n}$ represents the weighted value of each pixel O(i,j), and $WO_{\theta,m,n}$ is derived from the trained neural network designed by the invention.

$$P(m, n) = \sum_{i=0}^{N-1} \sum_{j=0}^{N-1} O(i, j) W_{\theta,m,n}(i, j) \qquad (1)$$

Image blurring and jaggedness can be generated on the image contour or edge due to physical constraints on the conventional image interpolation; therefore, the quality of image will be lowered. An ideal enlargement technique should take the orientation of image edge into consideration so that the image contour can be clearer and its sharpness can be better. To achieve the ideal technique, the invention utilizes the human vision system as the mechanism of image analysis because the human vision system is more sensitive to the edge portion of the image than to the other portions of the image, and the property of human eyes can be utilized to analyze the structure of an image. The following embodiment is to illustrate the foregoing technical contents so that it can be well understood by those who are skilled in the art.

Figure 5:
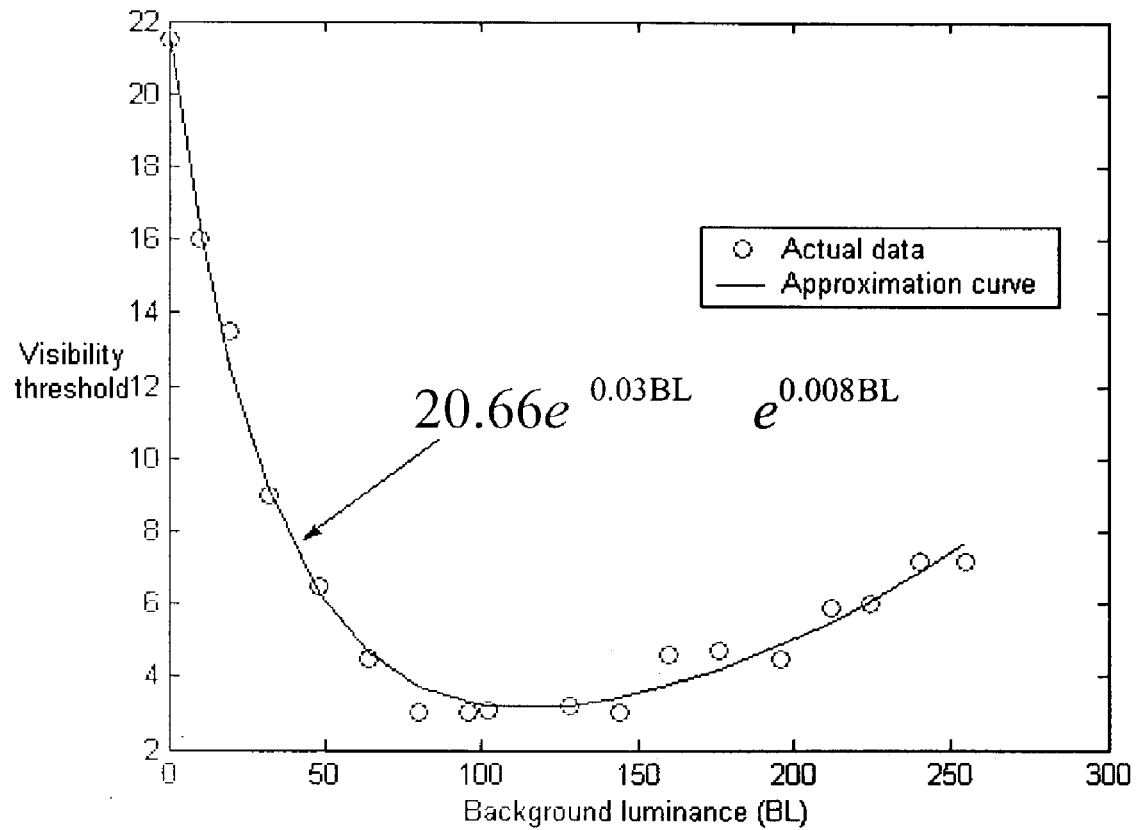
FIG. 5 is a schematic diagram showing a curve in the human vision system.
Figure 6A:
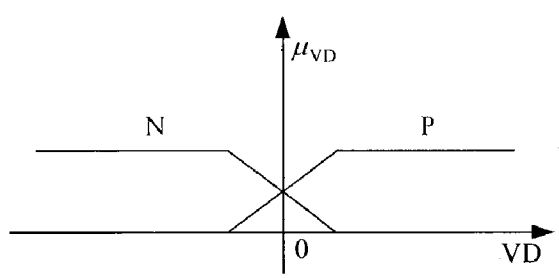
FIGS. 6(a) to 6(d) are schematic diagrams showing the input variable visibility, the structure, the complexity, and the membership function of the output variable respectively for the fuzzy analysis system of the invention.
Figure 6B:
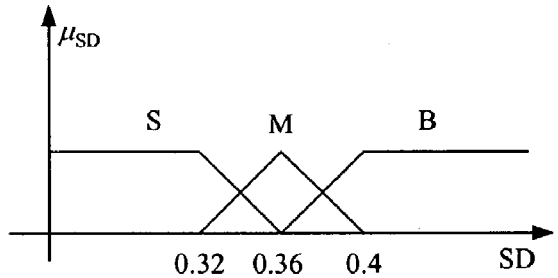
Figure 6C:
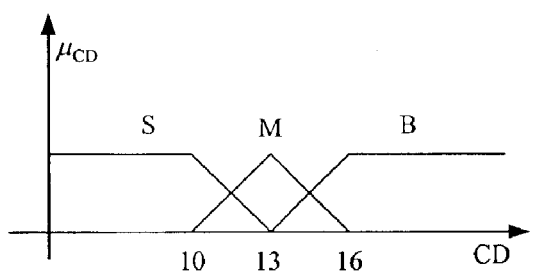
Figure 6D:
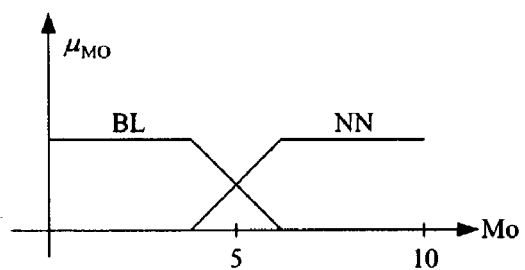

Concerning the fuzzy analysis system, it is known from the study of human vision system that the human eyes are more sensitive to the contrast of image colors than to the brightness of image. In addition, the ability of human eyes to distinguish the difference between an image object and its background depends upon average brightness of its background. As shown in FIG. 5, the axis of ordinate in the graph represents the visibility threshold of human vision, whereas the axis of abscissa represents the average background brightness (BL) of an image. It is shown in the graph that the visibility threshold becomes very high when the average background brightness is in a very bright area or very dark area, which means that in the two areas the ability of human eyes to distinguish between an object and its background becomes weaken. In other words, in such two areas, the color difference (or brightness difference) between an object and its background must be big enough in order to be distinguished by human eyes. Conversely, when the average background brightness falls in between 70 to 150, human eyes can easily distinguish the difference between an object and its background. In other words, in this area, the color difference (or brightness difference) between an object and its background dose not have to be significant.

Except from the ability of distinguishing between an object and its background, the human vision system can also respond differently according to different structures of images. Human eyes respond sensitively to an area with high contrast such as image structure, contour, and edge, but do not respond the same to a smooth image area. In order to meet the requirements of after-processing image quality and fast processing time, the invention provides a fuzzy analysis system based on the human vision system. The main function of fuzzy analysis system is to classify the inputted image content into one with edge quality and the other without edge quality. The one with edge quality will apply the neural network interpolation for processing, whereas the one without edge quality will apply the bilinear enlargement technique, and the processing will be in accordance with the adjustment made by the parameters so that the invention can perform its best on image quality and processing speed.

There are three input variables in the configuration of fuzzy analysis system, which are visibility (VD), structure (SD), and complexity (CD), while the input variable (Mo) is a selected mode. The following is Formula (2):

$$V(BL) = 20.66 e^{-0.03 BL} + e^{0.008 BL} \qquad (2)$$

As shown in Formula (2), the curve formula V(BL) in FIG. 5 can be obtained by nonlinear regression, wherein BL represents an average background brightness of N*N image mask. Applying the difference between D and V(BL), Formula (3) can be obtained as follows:

$$VD = D - V(BL) \qquad (3)$$

where D is a difference between the maximum pixel and the minimum pixel of the original image, as expressed in Formula (4):

$$D = \max(O(i,j)) - \min(O(i,j)) \qquad (4)$$

Formula (3) is to check that under a certain background brightness BL whether there is any object visible by human eyes in the N*N image mask. If VD is larger than zero, it is easy to distinguish the object from the background within the area of N*N image mask. On the contrary, if VD is smaller than zero, the area is not a vision-sensitive area. Moreover, SD and CD are used to analyze whether the pixels in the image mask contain edge structure, wherein SD shows whether the pixels in the image mask are obviously separated into two clusters, as shown in formula (5):

$$SD = \frac{\left| \max(O(i,j)) - \frac{1}{8} \sum_{i=0}^{3} \sum_{j=0}^{3} O(i,j) + \min(O(i,j)) \right|}{\max(O(i,j)) - \min(O(i,j))} \qquad (5)$$

If SD is a large value, it means that the pixels in the image mask are not separated into two clusters, and that the area might be a smooth area or with noise. On the contrary, if SD approaches zero, it means that the pixels in the image mask are separated into two clusters, or the image mask might contain edge or texture structure. However, both edge and texture structures will show the same value after the calculation of SD shown in Formula 5 is done; therefore, a variable CD is added in to distinguish the edge from the texture, as shown in Formula (6):

$$CD = \sum_{i=0}^{N} \sum_{j=0}^{N} |4 O'(i,j) - [O'(i+1,j) + O'(i-1,j) + O'(i,j+1) + O'(i,j-1)]| \qquad (6)$$

The invention analyzes the phenomenon in the image mask with a concept that the differentiation works well on figuring out the noise. It can be understood from Formula (6) that if the texture structure is contained in the image mask, the value of CD will appear to be relatively high; conversely, if the edge structure is contained in the image mask, the value of CD will appear to be relatively low.

Moreover, the input variable visibility VD includes two fuzzy sets; one is negative (N) and the other is positive (P). The input variable structure SD includes three fuzzy sets; they are small (S), medium (M), and large (L) fuzzy sets. Similarly, the input variable complexity CD also includes three S, M, and L fuzzy sets. The output variable Mo includes two fuzzy sets, the bilinear BL and the neural network NN. The membership functions used by each of the variables are shown in FIGS. 6(a) to 6(d). Various changes can be made to the above-mentioned fuzzy sets and membership functions used thereof according to different applications. The seven fuzzy rules below are based upon the foregoing variables and membership functions:

If VD=N, then Mo=BL;
If SD=L, then Mo=BL;
If CD=L, then Mo=BL;
If VD=P, SD=S, and CD=S, then Mo=NN;
If VD=P, SD=S, and CD=M, then Mo=NN;
If VD=P, SD=M, and CD=S, then Mo=NN; and
If VD=P, SD=M, and CD=M, then Mo=BL.

Among them, the output variable Mo will obtain a number between 0 and 10 after defuzzification. The invention decides a threshold (TH) value according to the object to be processed. When Mo≧Th, the neural network interpolation is selected for processing; conversely, when Mo<Th, the bilinear interpolation is selected for processing.

Concerning the angle calculation and the neural network interpolation, in recent years a lot of contour-oriented image interpolation techniques have been proposed. However, there is no definite answer for questions like how to design a most appropriate image interpolation method and how to evaluate an after-processing image quality. In viewing the above-mentioned problems, the invention provides an interpolation technique that combines both bilinear interpolation and neural network interpolation to solve the problems. When the content of image mask has been proved to be with edge quality after being classified by the fuzzy analysis system, the edge angle will be calculated, as shown in FIG. 3. A(i,j) represents an angle of O(i,j) in the image mask at the time of calculation. The calculation is shown in Formula (7) as below:

$$A(i, j) = -\frac{180}{\pi}\left[\tan^{-1}\left(\frac{Dy(i, j)}{Dx(i, j)}\right)\right] \quad (7)$$

where the values of Dy(i,j) and Dx(i,j) are shown in Formulas (8) and (9) respectively as below:

$$Dx(i,j)=O(i-1, j-1)+2O(i-1,j)+O(i-1, j+1)-(O(i+1, j-1)+2O(i+1,j)+O(i+1,j+1)) \quad (8)$$

$$Dy(i,j)=O(i-1, j-1)+2O(i,j-1)+O(i+1, j-1)-(O(i-1, j+1)+2O(i,j+1)+O(i+1, j+1)) \quad (9)$$

where the ranges for I and j are 0≦i≦N and 0≦j≦N respectively, and the derived angle can be quantized into the needed portions freely. If a reference pixel is classified as a pixel without orientation, then the bilinear interpolation should be applied to process the pixels required to be interpolated so as to reduce calculations, as shown in Formula (10):

$$P(m, n) = \frac{\sum_{i=1}^{2}\sum_{j=1}^{2}\frac{O(i, j)}{distance(O(i, j), P(m, n))}}{\sum_{i=1}^{2}\sum_{j=1}^{2}\frac{1}{distance(O(i, j), P(m, n))}} \quad (10)$$

On the contrary, if the reference pixel is classified as having a main orientation, then the neural network interpolation should be applied to the system for processing in order to maintain the image quality in the human vision system.

Figure 7:
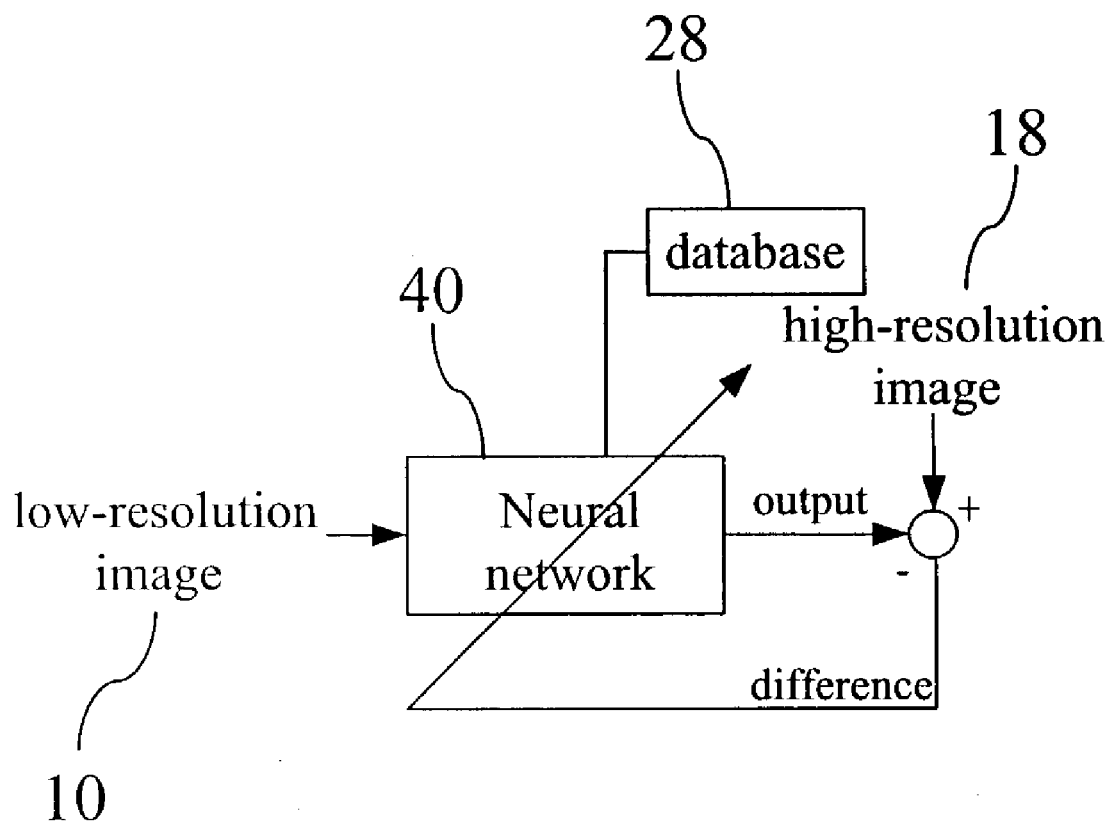
FIG. 7 is schematic flow chart showing the weighted value training of the neural network of the invention.

The invention uses the supervised learning rules to train the neural network. First, the data of desired input and output of network must be obtained; therefore, the actual output can be obtained by inputting data into the network. Then, the actual output is compared with the desired output, and the difference between the two will become the basis for the invention to train the network. More specifically, the invention utilizes an advanced image-retrieving device to retrieve a couple of high-resolution digital images. Assume that one of the high-resolution digital images is $I_{N \times N}$. A new image $I'_{M \times M}$ can be obtained after making a sampling processing on the content of $I_{N \times N}$, where M=N/k and I'(x,y)=I(kx,ky). In other words, $I_{N \times N}$ is an ideal image after $I'_{M \times M}$ is enlarged with k times. Therefore, the input of neural network can be obtained from $I'_{M \times M}$, and the desired output can be obtained from $I_{N \times N}$. The process flow of weighted value training is shown in FIG. 7. After the low-resolution original image 10 enters into the neural network 40, the obtained output will be compared with the content of high-resolution digital image 18. The difference between the two will be a basis for correcting the weighted value of neural network 40, while the database 28 is used to store the pertinent parameters in the system of the invention after the training is completed. On the other hand, the area of the image without edge quality adopts the bilinear interpolation; therefore, the training data used for training the neural network should be found in the pixel area belonging to the edge contour in $I'_{M \times M}$, as shown in FIG. 4. Assume that I'(i,j) is an reference pixel in the image, where O(1,1)=I'(i,j). After the analysis, the pixel is on an image contour whose angle is θ, whereas the pixel that needs to be interpolated is P(m,n). Therefore, the vector inputted by the network can be expressed as IP=[θ m n]$^T$, and the network output is Y. Meanwhile, the desired output of neural network can be obtained from the high-resolution original image, and can be expressed as I(ki+m,kj+n).

Figure 8:
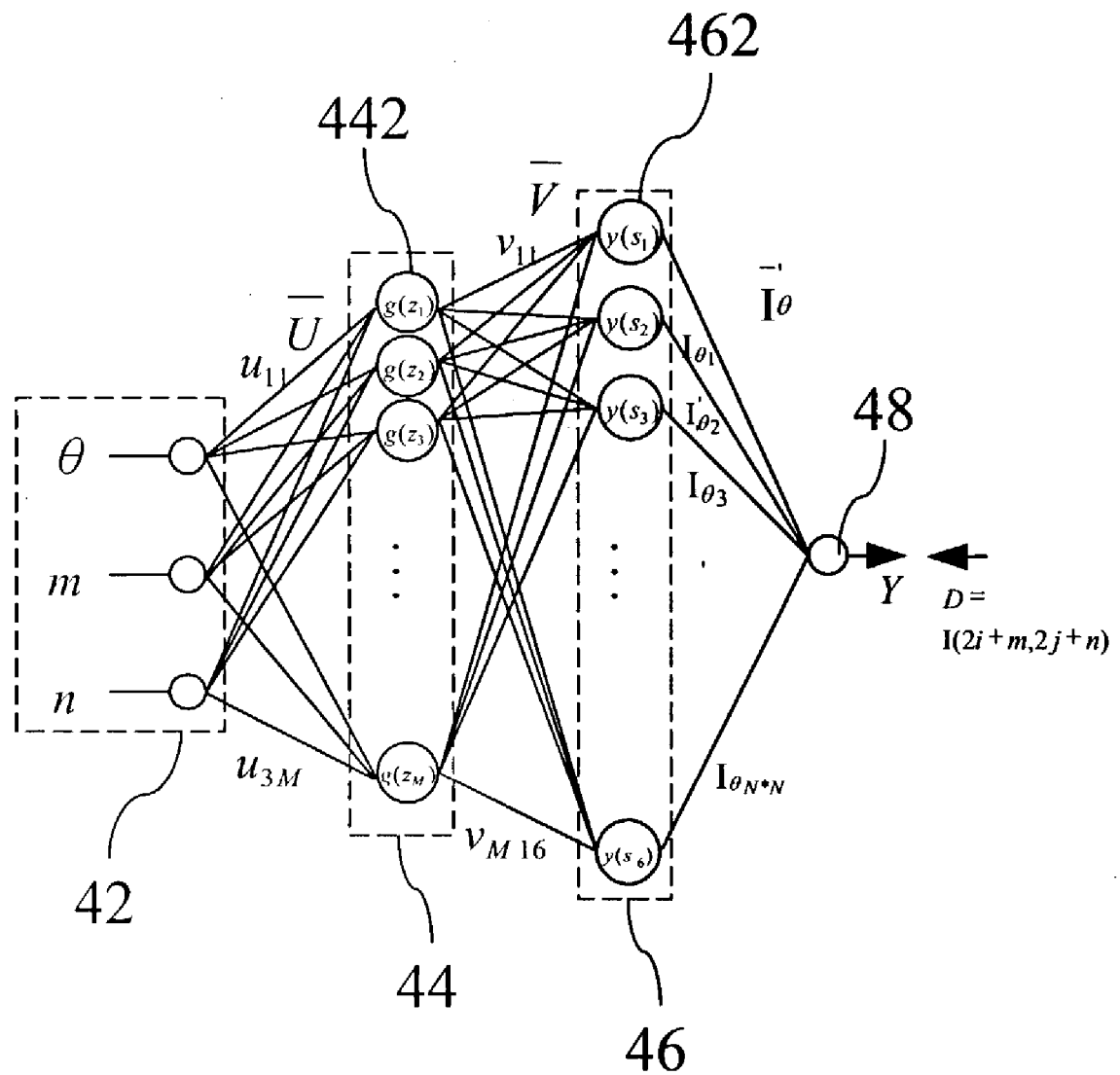
FIG. 8 is a schematic diagram showing the configuration of neural network used for image interpolation.
Figure 9A:
FIGS. 9(a) to 9(d) are schematic diagrams showing images of a blooming plant, including an original image and three other images enlarged 400 percent of the original by using the interpolation technique of the invention, the conventional bilinear interpolation, and the bi-cubic interpolation respectively.
Figure 9B:
Figure 9C:
Figure 9D:
Figure 10A:
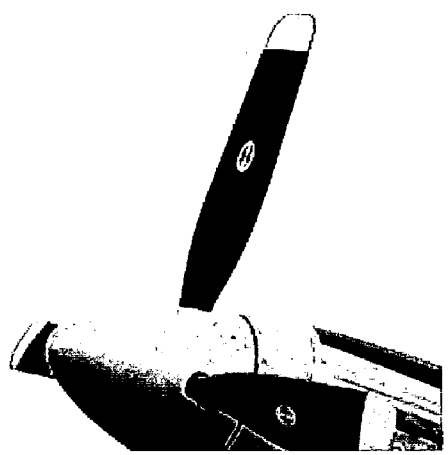
FIGS. 10(a) to 10(d) are schematic diagrams showing images of airplane propellers, including an original image and three other images enlarged 400 percent of the original by using the interpolation technique of the invention, the conventional bilinear interpolation, and the bi-cubic interpolation respectively.
Figure 10B:
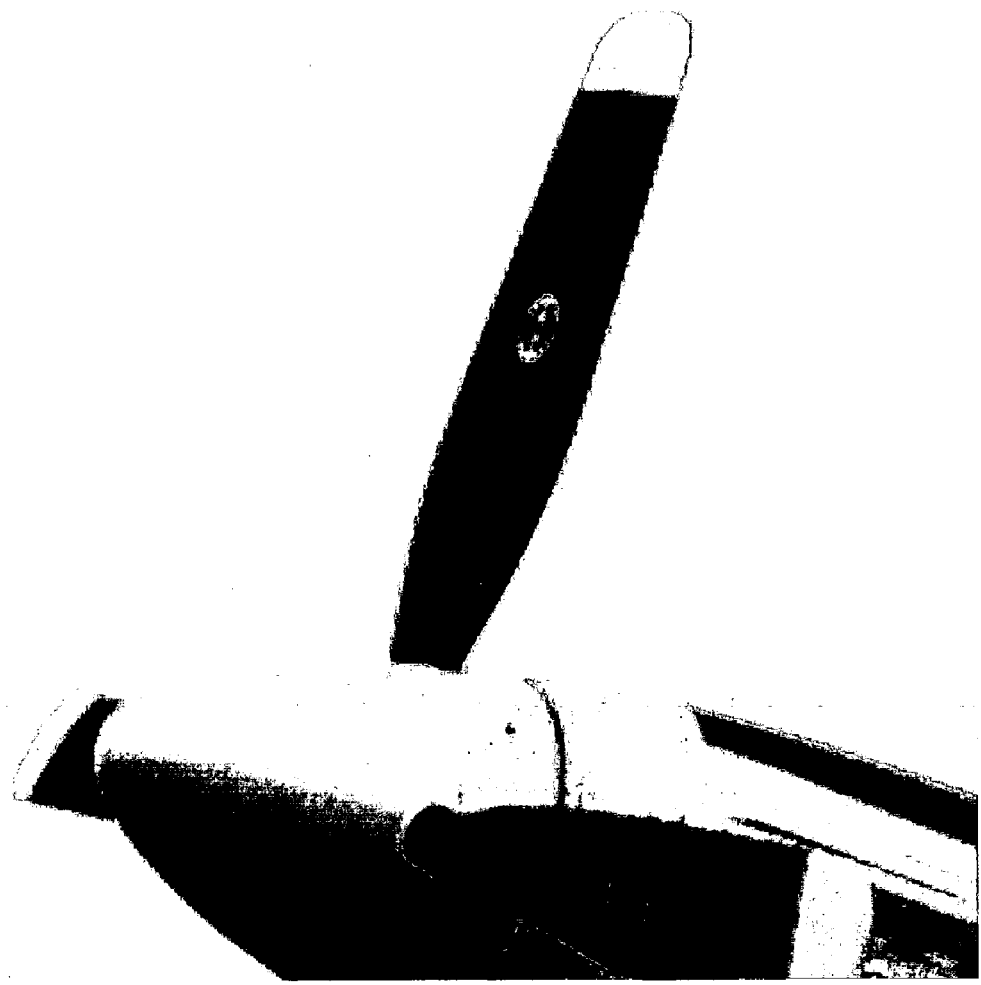
Figure 10C:
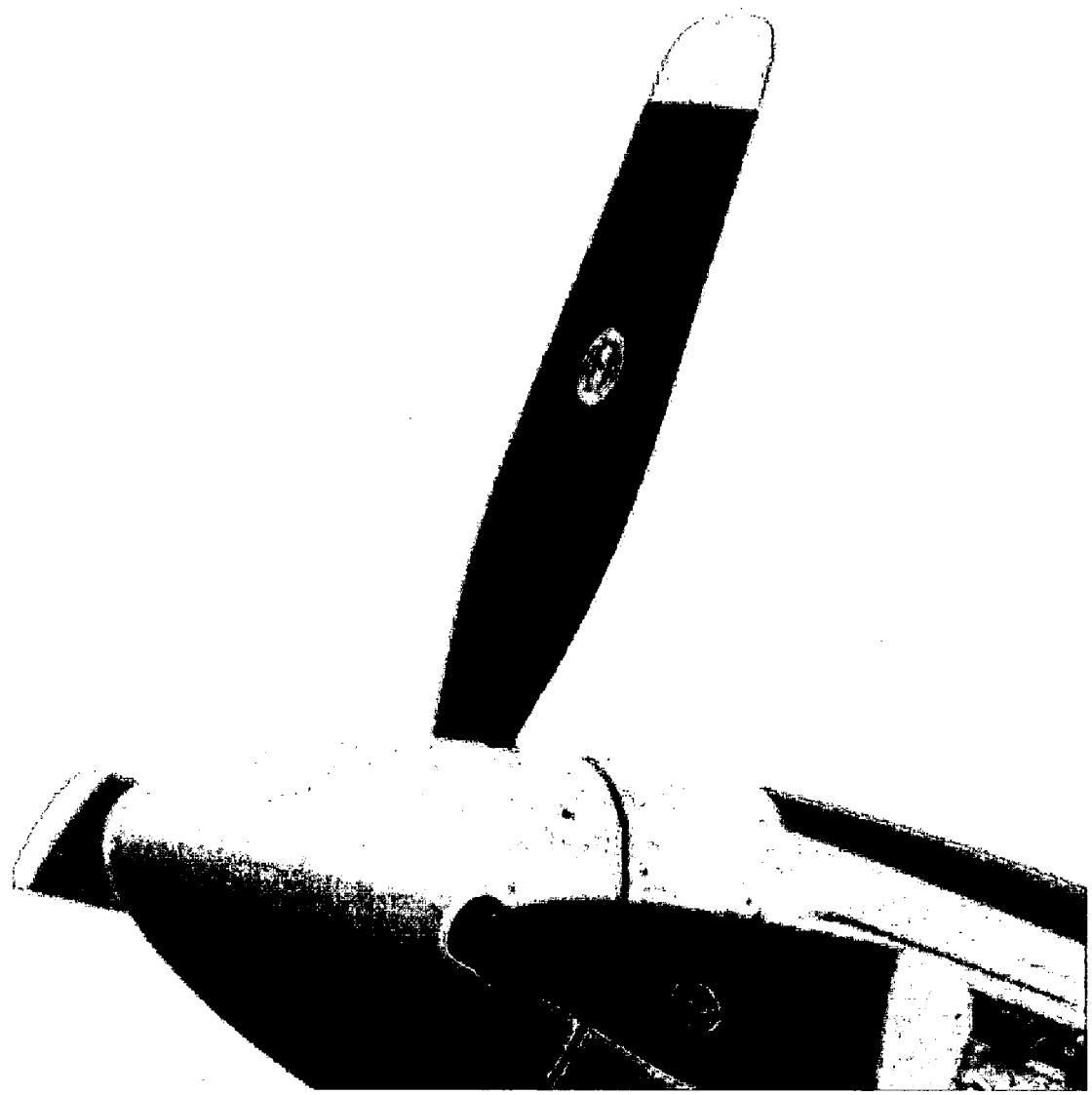
Figure 10:
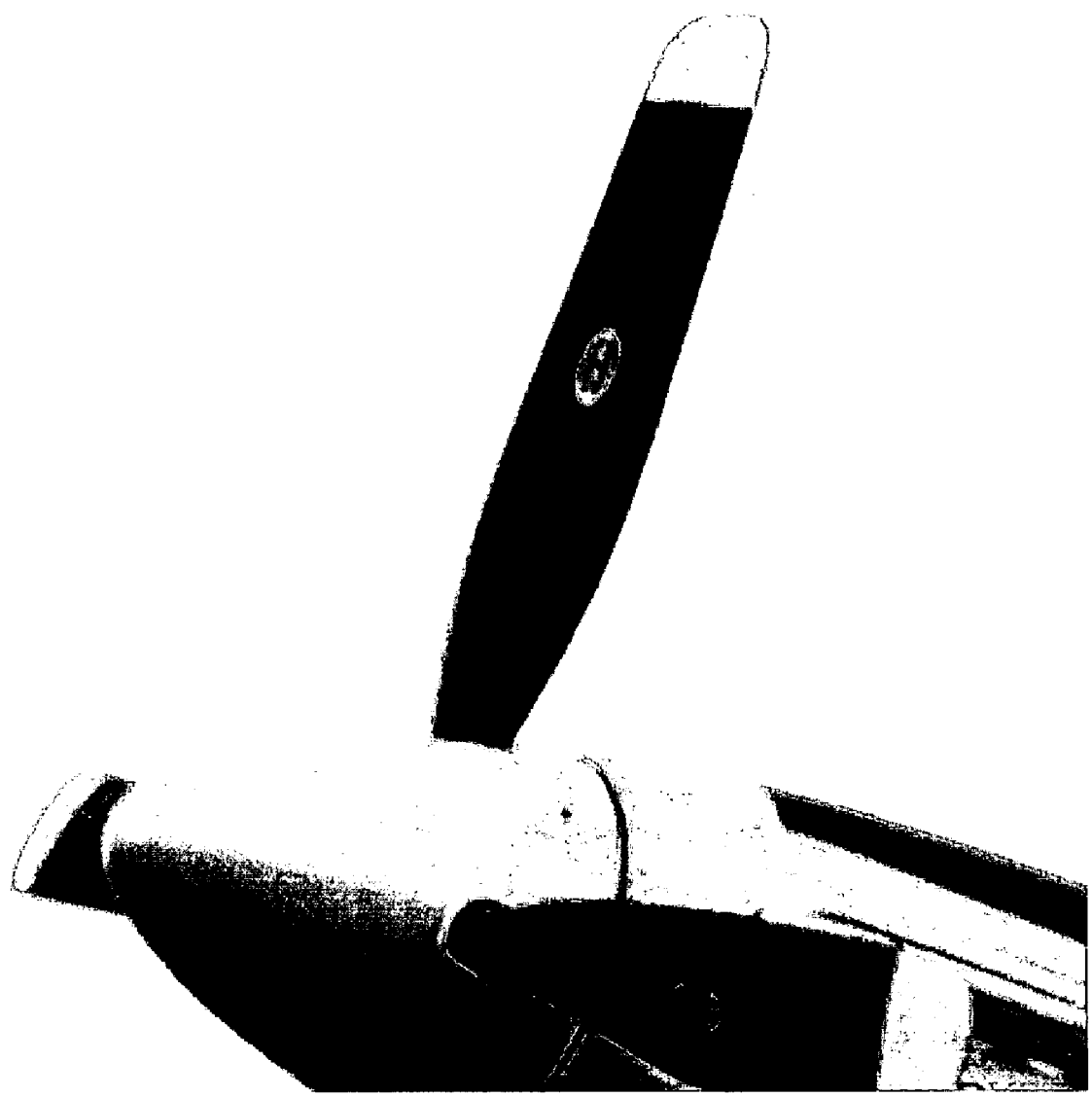

The invention is to design a network configuration exclusively used for image interpolation. As shown in FIG. 8, the network contains four-layer neural network, including one input layer 42, two hidden layers 44 and 46, and one output layer neuron 48. The input layer 42 of network includes three variables, which are θ, m and n. In addition, the second layer of network is the hidden layer 44, which is also the first layer of the two hidden layers, including M number of neurons 442. As known from the experiment that the quantity of M is between 150 and 300, but in real-life application the quantity is not limited to these numbers. Moreover, in the neurons 442, the invention uses a bipolar activation function as an example of activation function for the invention, as shown in Formula (11). However, other activation functions may also be adopted according to different applications.

$$g(x) = y(x) = \frac{2}{1+e^{-\alpha x}} - 1 \quad (11)$$

In the network, the weighted value between the input layer 42 and the hidden layer 44 is expressed as $\overline{U}$. The third layer of network is the hidden layer 46, which is also the second layer of two hidden layers, including N*N neurons 462. Similarly, a bipolar activation function is used in the neurons 462, and the weighted vector between the second hidden layer 44 and the third hidden layer 46 is expressed as $\overline{V}$. The output of each neuron 462 of the hidden layer 46 is expressed as $y(s_i)$, which also represents each of $W_{\theta,m,n}$ elements in Formula (1). In addition, the output of fourth layer of network is neuron 48, which represents the pixel P(m,n) needed to be interpolated. The weighted vector between the hidden layer 36 and the neuron 48 is expressed as $\overline{I}_\theta$, which includes a reference pixel that belongs to the angle θ and the value of N*N neighboring pixels of the reference pixel, with reference to the gray portions of FIG. 4. The reference pixel can be regarded as an extra input of neural network, as shown in Formula (12).

$$\vec{I'}_\theta = \begin{bmatrix} I'_{\theta 1} \\ I'_{\theta 2} \\ I'_{\theta 3} \\ I'_{\theta 4} \\ I'_{\theta 5} \\ \vdots \\ I'_{\theta N \times N} \end{bmatrix} \quad (12)$$

Also, the output of network can be expressed as below:

$$Y = \sum_{x=1}^{N*N} y(s_x) \cdot I'_{\theta x} \quad (13)$$

Meanwhile, the corresponding expected output can be expressed as follows:

$$D = I(ki+m, kj+n) \quad (14)$$

The methods of updating parameters $v_{ab} \epsilon V$ and $u_{bc} \epsilon U$ are shown in Formulas (15) and (16) respectively. When the network training of neural network is finished, the invention can obtain a corresponding neuron 462 $y(s_i)$ used as a tool for a free-will natural image enlargement through different inputs.

$$v_{ab}(t+1) = v_{ab}(t) + \eta_1(D-Y)[I'_{\theta a}(1+y(s_a))(1-y(s_a))/2] \times \quad (15)$$
$$g(Z_a)$$

$$u_{bc}(t+1) = u_{bc}(t) + \quad (16)$$
$$\eta_2 \left\{ \sum_{i=1}^{N \times N} \left[ (D-Y)(I'_{\theta i}) \frac{(1+y(s_i))(1-y(s_i))}{2} v_{ib} \right] \right\} \times$$
$$[(1+g(Z_b))(1-g(Z_b))/2]IP_c$$

The invention is to select a few pieces of natural image as training samples, which mostly are photographed with high-resolution digital photographing apparatus. After the training of neural network is finished, two of the natural images are selected for experiment, including a blooming plant and a propeller. In the experiment, the invention compares the image interpolation technique with two conventional linear interpolation techniques, bilinear interpolation and bi-cubic interpolation. FIGS. 9(*a*) and 10(*a*) are original images before enlargement, whereas FIGS. 9(*b*) to 9(*d*) and 10(*b*) to 10(*d*) are results of original images being enlarged by 400% using the bilinear interpolation, bi-cubic interpolation, and neural network interpolation of the invention respectively. It is obvious from the experiment result that the image generated by the interpolation of the invention is superior to the other two techniques in both clarity of the image and sharpness of the image edge.

Therefore, the invention utilizes the fuzzy analysis system based on the human vision system to judge the contour of image edge that can be seen by human eyes, find out the characteristics of the contour of image edge, and then use the characteristics as a reference to the image enlargement technique of neural network. In fact, when the edge portion of the image is decided, the effect of the image being enlarged is also decided at the same time. It can be concluded from the above experiment that the invention is able to adjust the after-processing image quality and the time needed for processing the image by changing the parameters and threshold value in the fuzzy analysis system in order to meet people's requirements.

To sum up, the invention combines both the image edge detecting technique of the fuzzy analysis system and the learning ability of the neural network in order to design a neural network image interpolation technique that is different from the conventional techniques. By the method of learning, the characteristics of natural image are used as the basis for image interpolation. It is known from the experiment that the image processed with neural network image interpolation is better than the image processed with either bilinear interpolation or bi-cubic interpolation in both clarity and sharpness of the image edge. Moreover, appropriate variables or parameters are adopted according to various applications so as to acquire a balance between the image quality and the processing time.

The specific embodiment above is only intended to illustrate the invention so as to be better understood by those who are skilled in the art. The embodiment dose not, however, to limit the invention to the specific embodiment. Accordingly, those who are skilled in the art can make various modifications and changes without departing from the spirit and scope of the invention as described in the following claims.

What is claimed is:

1. A method for image resolution enhancement, including the following steps:
   providing an original image;
   dividing the original image into a plurality of image portions using an image mask;
   utilizing a fuzzy analysis system to analyze each of the plurality of image portions of the original image by first determining if a visibility value is greater than zero, if the visibility value is greater than zero then a structure value is calculated to distinguish smooth areas from areas having texture or edge qualities, and a complexity value is calculated to distinguish an area with an edge quality from an area having a texture quality, and based thereon each image portion of the original image being classified into one with an edge quality and another one without an edge quality;
   calculating the edge angle of the area classified to be with the edge quality and inputting coordinates of the area with the edge quality and the edge angle to a neural network, the neural network multiplies a reference pixel that belongs to the edge angle and neighboring pixels of the reference pixel by weighted values derived from a trained neural network respectively, and sums the multiplied results to obtain an interpolated pixel;
   processing the area classified to be without the edge quality with bilinear interpolation; and
   obtaining a high-resolution digital image after completing the whole original image processing.

2. The method for image resolution enhancement as claimed in claim 1, wherein the image mask is composed of N*N pixels.

3. The method for image resolution enhancement as claimed in claim 1, wherein the fuzzy analysis system includes an image analysis module for dividing and analyzing the original image, and a classification module for classifying the original image according to the analytical result from the image analysis module.

4. The method for image resolution enhancement as claimed in claim 3, wherein the image analysis module includes:
   an image edge retrieving module, which retrieves the edge area of the original image; and
   an angle calculation unit, which calculates the angle of each pixel on the edge area by utilizing the edge area with orientation.

5. The method for image resolution enhancement as claimed in claim 1, wherein during the classification performed by the fuzzy analysis system, if the output variable is larger than or equal to the preset threshold value, the neural network interpolation should be applied to process the original image; on the other hand, if the output variable is smaller than the preset threshold value, the bilinear interpolation should be applied.

6. The method for image resolution enhancement as claimed in claim 5, wherein the threshold value can be determined according to the digital image and its condition required for processing.

7. The method for image resolution enhancement as claimed in claim 1, wherein in the step of calculating the edge angle, an angle calculation module is applied to calculate the angle of the edge area.

8. The method for image resolution enhancement as claimed in claim 1, wherein the neural network interpolation utilizes the supervised learning method to train the neural network and stores the pertinent parameters in a database after the neural network training is completed.

9. A method for image resolution enhancement, including the following steps:
   providing an original image;
   dividing the original image into a plurality of image portions using an image mask;
   utilizing a fuzzy analysis system to analyze each of the plurality of image portions of the original image by first determining if a visibility value is greater than zero, if the visibility value is greater than zero then a structure value is calculated to distinguish smooth areas from areas having texture or edge qualities, and a complexity value is calculated to distinguish an area with an edge quality from an area having a texture quality, and based thereon each image portion of the original image being classified into one with an edge quality and another one without an edge quality;
   retrieving the edge portion of the original image from respective ones of the plurality of image portions;
   calculating the angle of each pixel on the image edge area;
   classifying the plurality of image portions of the original image into areas with edge quality and areas without edge quality according to the position of image edge area and the angle being calculated;
   processing areas classified to be with edge quality with a neural network interpolation and the areas classified to be without edge quality with a bilinear interpolation, wherein the neural network interpolation multiplies a reference pixel that belongs to the edge angle and neighboring pixels of the reference pixel by weighted values derived from a trained neural network respectively, and sums the multiplied results to obtain the interpolated pixel; and
   finishing the whole original image processing to obtain a high-resolution digital image.

10. The method for image resolution enhancement as claimed in claim 9, wherein the image mask is composed of N*N pixels.

11. The method for image resolution enhancement as claimed in claim 9, wherein in the step of calculating the angle, an angle calculation module is applied to calculate the angle of edge area.

12. The method for image resolution enhancement as claimed in claim 9, wherein the neural network interpolation utilizes the supervised learning method to train the neural network and stores the pertinent parameters in a database after the neural network training is completed.

* * * * *